(12) United States Patent
Iseli et al.

(10) Patent No.: US 9,429,733 B2
(45) Date of Patent: Aug. 30, 2016

(54) OPTICAL INSTRUMENT HAVING A STABILIZATION ELEMENT FOR MOUNTING AND ADJUSTING AN OPTICAL ASSEMBLY IN A HOLDER, AND MOUNTING METHOD FOR THE STABILIZATION ELEMENT

(75) Inventors: Claudio Iseli, Au (CH); Jochen Scheja, Heerbrugg (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 243 days.

(21) Appl. No.: 13/823,212

(22) PCT Filed: Sep. 20, 2011

(86) PCT No.: PCT/EP2011/066357
§ 371 (c)(1),
(2), (4) Date: Mar. 14, 2013

(87) PCT Pub. No.: WO2012/038447
PCT Pub. Date: Mar. 29, 2012

(65) Prior Publication Data
US 2013/0170053 A1 Jul. 4, 2013

(30) Foreign Application Priority Data
Sep. 22, 2010 (EP) .................................. 10178351

(51) Int. Cl.
*G02B 7/02* (2006.01)
(52) U.S. Cl.
CPC ............... *G02B 7/02* (2013.01); *G02B 7/023* (2013.01); *G02B 7/026* (2013.01)
(58) Field of Classification Search
CPC ......... G02B 7/02; G02B 7/026; G02B 7/023
See application file for complete search history.

(56) References Cited

U.S. PATENT DOCUMENTS

| 4,812,015 A | 3/1989 | Iizuka et al. |
| 4,854,671 A * | 8/1989 | Hanke ................... G02B 7/028 359/820 |

(Continued)

FOREIGN PATENT DOCUMENTS

| DE | 1 127 110 B | 4/1962 |
| DE | 86 25 896.6 U1 | 11/1986 |

(Continued)

OTHER PUBLICATIONS

Valente et al., "Interference fit equations for lens cell design using elastomeric lens mountings", Optical Engineering, vol. 33, No. 4, Apr. 1, 1994, pp. 1223-1228.

(Continued)

*Primary Examiner* — Joseph P Martinez
(74) *Attorney, Agent, or Firm* — Maschoff Brennan (57) ABSTRACT

An optical instrument for measuring has an a stabilization component for stably connecting an optical assembly and holder to at least one stabilization element that can be compressed in the gap. The stabilization element has, in an unmounted state, a thickness which is greater than the width of the gap, and the optical assembly, the holder and the stabilization component are configured and cooperate such that the stabilization element, which is positioned between optical assembly and holder, in a roughly positioned state, is compressed, by way of inserting the optical assembly into the holder, into the gap and is plastically deformed in the gap such that elastic forces act radially with respect to the optical axis between assembly and holder and the assembly and the holder are disposed in the radial direction in a stabilized state with respect to one another.

20 Claims, 5 Drawing Sheets

(56) References Cited

U.S. PATENT DOCUMENTS

| | | | |
|---|---|---|---|
| 5,052,782 A | 10/1991 | Myer | |
| 6,292,311 B1 * | 9/2001 | Bohn | G02B 7/026 |
| | | | 359/811 |
| 6,310,735 B1 | 10/2001 | Best et al. | |

FOREIGN PATENT DOCUMENTS

| DE | 199 24 849 C1 | 7/2000 |
|---|---|---|
| DE | 100 43 344 A1 | 5/2001 |
| EP | 1 677 133 A1 | 7/2006 |
| GB | 906278 A | 9/1962 |
| GB | 2 195 469 A | 4/1988 |
| JP | S59-228615 A | 12/1984 |

OTHER PUBLICATIONS

European Search Report dated Jan. 18, 2011 in Application No. 10 17 8351.

CN Office Action as received in Application No. 2011800457172 (English Translation).

* cited by examiner

OPTICAL INSTRUMENT HAVING A STABILIZATION ELEMENT FOR MOUNTING AND ADJUSTING AN OPTICAL ASSEMBLY IN A HOLDER, AND MOUNTING METHOD FOR THE STABILIZATION ELEMENT

FIELD OF THE INVENTION

The invention relates to an optical instrument having an optical assembly, a holder for the optical assembly and a stabilization component and to a mounting method for the precisely positioned mounting of an optical assembly in a holder with a stabilization.

BACKGROUND

Optical instruments are generally used for recording properties of defined points in a measurement environment. Known examples of such measurement apparatuses are, for example, geodetic apparatuses for surveying, for example the theodolite or a total station. Such apparatuses have angle and distance measurement functions, which allow direction and distance determination for a selected target. The angle and distance quantities are in this case ascertained in the internal reference system of the apparatus and, for an absolute position determination, may possibly also need to be correlated with an external reference system.

For exact distance determination, there is a sighting unit, usually a telescope, having an optical axis, in particular a sighting axis, in the surveying apparatus. A laser beam is coupled into it in order to measure the distance to measurement points, for example by means of pulse time-of-flight determination. Owing to the high required measurement accuracy in the mm range, most instruments are currently equipped with an electro-optical distance meter, which operates according to the phase measurement principle. These furthermore offer advantages in the case of distance-measuring theodolites owing to their relatively small volume.

Objectives, mirrors, lenses or other optical pieces must be installed and adjusted with high precision in the housing or in the sighting unit, so that no undesired deviations or reflections occur in the optical beam path and maximally accurate values can therefore be determined in a measurement. The input coupling element for the laser beam must also be fitted exactly therein, so that the direction of the beam can as far as possible be aligned, and is kept as far as possible time-invariantly, centrally and parallel to the sighting axis.

The accurate mounting of optical components or optical assemblies in suitable holders can, as is known, be ensured by carrying out elaborate processing of the components. Owing to the narrow tolerances, the components must be adapted as accurately as possible to one another, in order to achieve exact positionability. These processes are usually very cost-intensive and technologically demanding. Even very minor deviations in the processing of the components can lead to insufficiently stable connections and therefore necessitate reprocessing or the replacement of at least one of the components. Furthermore, thermal effects such as differing expansion behavior of the pieces can only be compensated for with difficulty since the components are usually made of different materials. Therefore, a relative position change of the components with respect to one another can occur, and the beam path of the optical piece can be modified in such a way that the required accuracy or even the functionality of the apparatus can no longer be ensured.

It is furthermore known that elastically compressed sealing elements, for example O-rings, are used for this mounting and placed and installed between the components. The tolerances for the manufacture of the components can therefore be increased and possibly necessary reprocessing operations can be obviated. Sometimes, said sealing elements are also used to ensure a degree of play in the radial direction.

A releasable and stress-free holder of an optical component placed in a centered fashion in a frame is known from DE 19 924 849. The optical component is in this case provided with a chamfered surface, inclined in the direction toward the frame in the edge region to be held, and the frame has a grooved recess open in front of the optical component in the axial direction. An annular element which is elastically deformable in the axial direction, for example an O-ring, is pressed in between the chamfered surface and the grooved recess.

The deformability in the axial direction allows tolerance compensation between the chamfered edge and the grooved recess, as well as compensation for material deformation in the axial direction. Minor tolerances between the chamfered edge and the position of the grooved recess are compensated for by an elastically deformable annular element. Material modifications in the axial direction can likewise be absorbed by the annular element. In addition, the annular element constitutes impact and vibration protection.

DE 10 043 344 furthermore discloses that an annular groove is formed on a circumferential surface of a lens, and the lens is radially and axially held exclusively by a connection which is formed by elastic elements on the lens frame, with free ends which engage radially into the annular groove. The different thermal expansions of the lens frame and the lens are in this case compensated for in the radial direction by means of the spring action of the segments. Owing to the fact that the lens is connected to the frame exclusively by means of elastic segments, dynamic loads are only transmitted to the lens in an attenuated fashion.

A disadvantage of using elastic sealing elements for the mounting is the high friction and the concomitant "stick-slip effects", which can occur during mounting and alignment and therefore make adjustment of the components more difficult. Distortions may in this case occur in the material and cause an asymmetric force distribution, which can lead by thermal or shock influences to relative displacements of the components. Furthermore, owing to incompressibility, absence of plasticity and relatively wide tolerance quality, these elements have high contact forces so that these parts is not optimally suitable for such mounting purposes. High forces can therefore occur between the components, which may in turn give rise to unstable behavior, and vibrations which occur cannot be attenuated in the necessary manner.

SUMMARY

Against this background, it is a general object of the present invention to provide improved and simplified mounting conditions for an optical instrument, with which on the one hand the mounting and adjustment of optical elements or optical assemblies in suitable holders or a suitable housing can be carried out with high precision, but on the other hand necessary thermal and mechanical/dynamic stabilities can also be ensured, and which furthermore lead to lower technological outlay.

It is a specific object of the invention to mount the optical element or the optical assembly with the aid of a stabilization element, and thereby simultaneously achieve required accuracies and stabilities. Furthermore, it is intended that manufacturing tolerances of the optical element or the optical assembly can be compensated for in such a way that, despite possible inaccurate manufacture of the components, their mounting and adjustment can nevertheless be carried out precisely.

An optical instrument according to the invention comprises an optical assembly, a holder for the assembly and a stabilization component for tolerance compensation and for stable connection of the optical assembly and the holder, with at least one stabilization element which can be compressed in a gap between the assembly and the holder, a deformation zone being provided on this stabilization element. The stabilization element furthermore has a thickness in the unmounted state which is greater than the width of the gap. In an approximately positioned state, owing to insertion of the optical assembly into the holder, pressure acts on the stabilization element, in particular on the deformation zone, so that the stabilization element is plastically deformed in the gap. Furthermore, in this adjustment state the angular setting of the optical assembly with respect to the holder can be aligned with high precision and the stabilization element is in said plastically deformed state. After alignment, the optical assembly and the holder are finally fixed in the high-precision alignment and therefore define a finally mounted state in which residual elastic forces due to the deformed stabilization element act radially with respect to an optical axis, in particular with respect to an optical sighting axis, between the assembly and the holder.

The step described as inserting the optical assembly into the holder may furthermore be subdivided into placement or positioning of the stabilization component on the optical component and subsequent joining of the combination consisting of the optical component and the stabilization component to the holder. During this joining, the optical component is inserted into the holder, or pushed into the holder, in such a way that the stabilization element then lies between the optical component and the holder and is likewise pushed between them, while being compressed between the two parts.

The stable mounting of an optical assembly, or at least parts of this assembly, must be carried out with utmost precision. According to the invention, to this end a mounter uses a suitable stabilization component having a plurality of stabilization elements. The stabilization component is placed between an objective and a holder provided therefor on a telescope, and the two parts are approximately connected to one another. The connection of the components causes compression of the stabilization elements in a gap provided between the telescope objective and the holder, so that the stabilization elements have at least partial plastic deformation. Radial forces occurring in this case lead to stable positioning of the two parts with respect to one another. Furthermore, the forces are formed in such a way that, owing to the elastic properties of the material of which the stabilization elements are made, precise fine adjustment of at least one degree of freedom can now be carried out by the mounter, for example the alignment of the angular setting or an axial alignment of the two components. By means of a screw ring, the objective is subsequently fixed with respect to the holder on the telescope in this high-precision alignment.

In particular, an optical instrument, for example a total station, may in this case comprise a stabilization component having one or more stabilization elements, so that the radial forces caused by the compression of the elements are uniformly distributed over the contact surfaces of the optical assembly or the holder.

In addition, the stabilization component may comprise a frame on which the stabilization elements are arranged, having a shape which corresponds to the shape of at least one of the components to be connected. This embodiment can facilitate the mounting of the stabilization elements in so far as each element does not have to be brought individually into a position intended therefor, but, owing to the correct positioning of one of the components, all elements connected thereto are in a defined position.

To this end, the stabilization component and its frame may, in particular, be configured in the form of a ring, the stabilization elements being distributed uniformly over the stabilization component and being aligned in the axial direction. This alignment makes it easier to position and align the stabilization elements in a gap. In order to further facilitate placement of the stabilization component, for example, between the optical assembly and the holder, and subsequent adjustment of the optical assembly, the stabilization component may consist of a plurality of parts. An annular component may, for example, be subdivided into individual annular segments each of a quadrant arc, four segments being individually inserted during mounting and thereby being assembled to form a ring.

Furthermore, the optical instrument with the optical assembly and the holder may be configured in such a way that the number of stabilization elements used for the mounting depends on the elastic forces perpendicular to the optical axis so that, in an adjustment state, the angular setting of the optical assembly with respect to the holder can be aligned with high precision, in particular by means of a sliding rotary movement, and the stabilization element is in this case in a plastically deformed state.

The optical instrument may furthermore comprise a stabilization element which has homogeneous plastic properties, in particular a homogeneous plastic flow range, particularly in the region of the deformation zone. Because the elastic properties of the stabilization element remain substantially constant over this flow range, a tolerance range required for accurate positioning of the components with respect to one another can be increased. It is therefore possible to save at least partially on manufacturing costs which need to be expended for precise processing of the components to be connected.

A stabilization component according to the invention may furthermore be produced by an injection molding method. The injection molding method offers the advantage of a rapid and technologically controllable way of production, and can keep the production costs of the components manageable or reduce them.

Furthermore, the stabilization component may be integrated into the optical assembly, in particular with the stabilization component and/or the stabilization element being injection-molded onto the optical assembly or the optical assembly and the stabilization component and/or the stabilization element being formed integrally. By this refinement, mounting of the parts can be facilitated in such a way that prior placement of the stabilization element or component between two parts can be obviated. Here, an optical instrument may be understood as being a geodetic apparatus, in particular a total station or a theodolite, and an optical assembly as being for example a telescope.

According to the invention, the stabilization element may have an essentially constant maximum material stress within a material stress range above an elastic limit or yield point with varying material strain and the stabilization element in the approximately positioned state may be in a loading state above the elastic limit or yield point.

Furthermore, according to the invention the stabilization element may consist of a particular manufacturing material having a defined stress/strain gradient within a plastic range of a stress/strain curve representing a stress/strain property of the manufacturing material, in particular with the manufacturing material (within the plastic range) having a material stress value of less than 1000 MPa, or between 5 MPa and 1000 MPa, in particular with the stress/strain gradient being defined by a given slope in the stress/strain curve for the manufacturing material of between −1000 MPa/(m/m) and +1000 MPa/(m/m) (within the plastic range), in particular between −500 MPa and +500 MPa, in particular between −250 MPa and +250 MPa (the stress/strain curve reflecting the material behavior under load), in particular with the stabilization element being plastically deformable with an essentially constant material strength within the plastic range. With a low gradient (close to 0), the stress/strain behavior therefore approximates an ideal plastic behavior.

According to the invention, a mounting method for the precisely positioned mounting of an optical assembly having a defined optical axis in a holder, there being a gap with a defined width between the assembly and the holder in the assembled state, comprises a stabilization component and at least one stabilization element which can be compressed in the gap, the stabilization element comprising a deformation zone. In this case, in a first step, the stabilization component is placed between the assembly and the holder and approximate positioning of the optical assembly and the holder is carried out. Furthermore, the stabilization element is compressed between the assembly and the holder, so that the deformation zone is deformed within a homogeneous plastic range and elastic properties are preserved. In the next step, the angular setting and/or an axial position of the optical assembly with respect to the holder is adjusted, the plastic deformation of the stabilization element being preserved. Lastly, the optical assembly and the holder are fixed, so that elastic forces between the assembly and the holder due to the deformed stabilization element act radially with respect to the optical axis.

In particular, the adjustment of the optical assembly with respect to the holder may be carried out by rotation of the optical assembly about the optical axis, in particular the sighting axis, and/or by an axial movement parallel to the optical axis.

The adjustment of the optical assembly into the holder intended therefor is necessary in order, for example, to align the beam path of an optical instrument in such a way that it extends centrally through the optical assembly. To this end, the optical assembly may be rotated indirectly by means of the compressed stabilization element on the one hand about its optical axis, and on the other hand the optical assembly may also be finely adjusted by sliding along the optical axis, for example in order to reach a predefined position in the holder and be fixed in this position. Such adjustment may be necessary in particular when further rotationally non-symmetrical parts are provided on the assembly and these need to be installed in an exactly predetermined position relative to the holder.

In particular, according to the invention, in the scope of the mounting method the stabilization element may be strained within a material stress range above an elastic limit or yield point with an essentially constant maximum material stress and be in a loading state above the elastic limit or yield point during the approximate positioning. In other words, the stabilization element may have an essentially constant maximum material stress within a material stress range above an elastic limit with varying material strain.

Furthermore, according to the invention the stabilization element may in this context consist of a particular manufacturing material having a defined stress/strain gradient within a plastic range of a stress/strain curve representing a stress/strain property of the manufacturing material, in particular with the stress/strain gradient being represented by a slope of between −1000 MPa/(m/m) and +1000 MPa/(m/m) (in particular between −500 MPa and +500 MPa, in particular between −250 MPa and +250 MPa) of the stress/strain curve for the manufacturing material, in particular with the manufacturing material having a material stress value of less than 1000 MPa, or between 5 MPa and 1000 MPa, in particular with the stabilization element being plastically deformed with an essentially constant material strength within the plastic range.

BRIEF DESCRIPTION OF THE DRAWINGS

The method according to the invention and the device according to the invention will be described in more detail below purely by way of example with the aid of specific exemplary embodiments schematically represented in the drawings, further advantages of the invention also being discussed. In detail.

DETAILED DESCRIPTION

Figure 1:
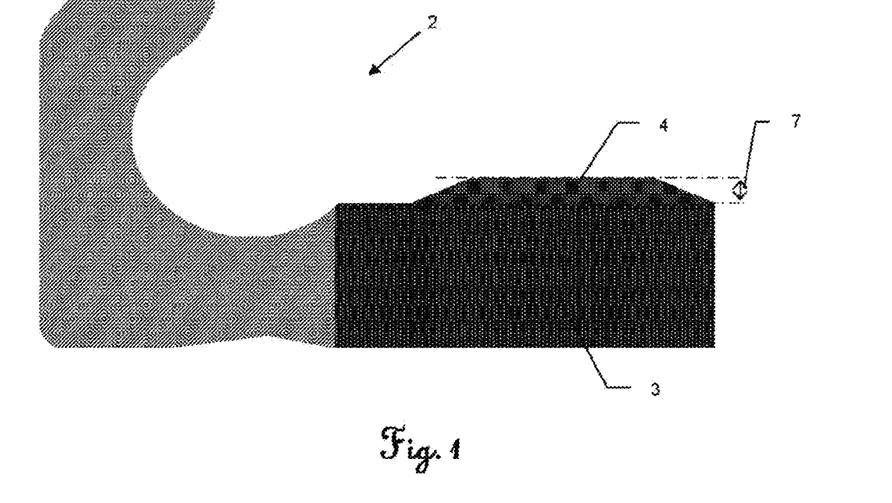
FIG. 1 shows a stabilization component according to the invention in cross section.

FIG. 1 shows a stabilization component 2 according to the invention for the mounting of an optical assembly in a holder in cross section. The stabilization component in this case consists of a stabilization element 3 with a deformation element 4. The deformation element furthermore comprises a compression region 7, within which the deformation element 4 is deformed during mounting of the stabilization component 2 in an optical instrument, but which is not exceeded.

The stabilization element 3 with the deformation element 4 is thicker than the width of a gap which exists between two precisely manufactured components when these are connected to one another in the intended way. By the compression of the stabilization element 3, a compressive stress is set up therein, which leads to plastic deformation in the deformation element 4.

The deformation is in this case restricted to a tolerance range in which the elastic compressive stress essentially remains constant in the manufacturing material. This prestress achieves thermally and climatically stable and shock-resistant positioning of two components with respect to one another.

Figure 2:
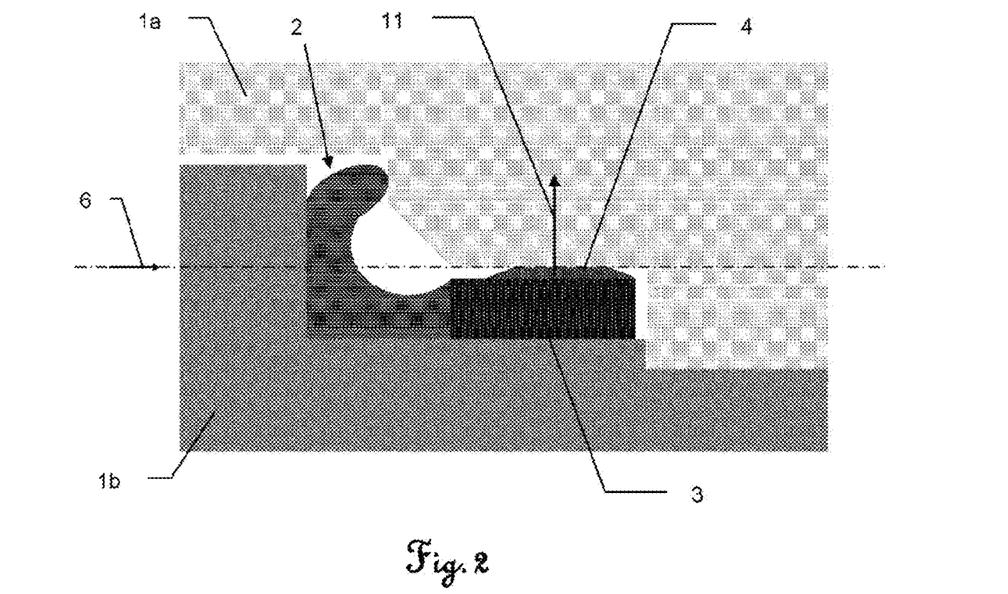
FIG. 2 shows a stabilization component according to the invention in the mounted state.

FIG. 2 schematically shows a stabilization component 2 according to the invention in the mounted state between a holder 1a and an optical assembly 1b in cross section. The stabilization component 2 and the optical assembly 1b are configured rotationally symmetrically about the optical axis—not shown here—of the optical assembly 1b. The deformation element 4 is deformed. Owing to the deformation, radially acting residual elastic forces 11 occur, which ensure that the components are positioned with respect to one another essentially without play and are supported shock-resistantly. The radial forces 11 are the result of the elastic material properties of the stabilization element 3 and of the deformation element 4, and the deformation of these elements. The arrow 6 denotes the direction in which the mounting of the parts takes place. The optical assembly 1b is pushed together with the stabilization component 2 into the holder 1a until they have both reached a premounting position. In this position, the optical assembly can be aligned precisely relative to the holder, and exact adjustment of the optical assembly can therefore be carried out. Owing to this arrangement, only one degree of freedom still remains in the system, here a rotational degree of freedom, and the alignment can therefore be carried out with high precision.

Figure 3:
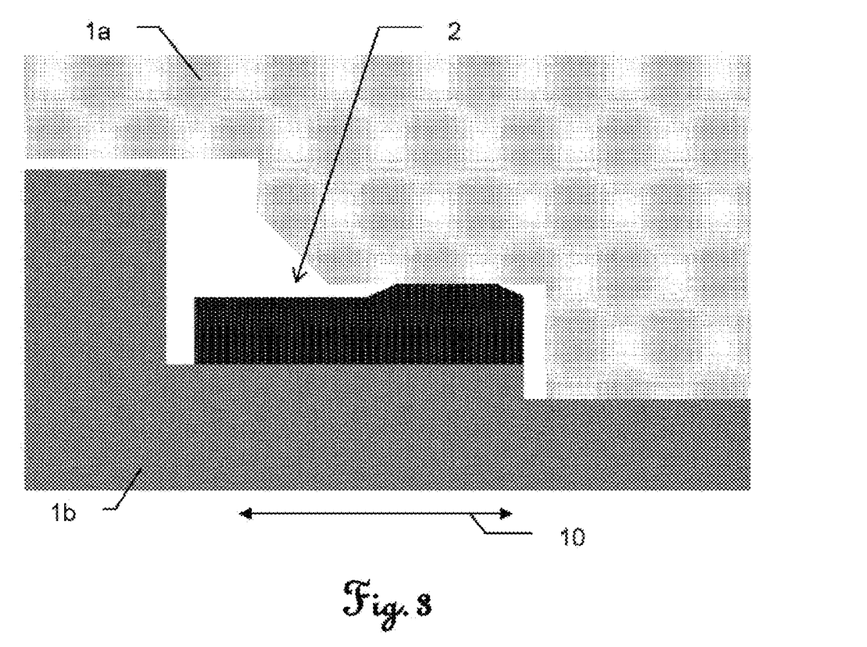
FIG. 3 shows a stabilization component according to the invention for axial alignment in the mounted state.

FIG. 3 likewise shows a stabilization component 2 according to the invention in the mounted state between a holder 1a and an optical assembly 1b. By this stabilization component 2, as indicated by the arrow 10, adjustment of the optical assembly 1b and the holder 1a relative to one another can be carried out in an axial direction. Owing to the specific material properties of the stabilization component 2, the optical assembly 1b can be moved substantially by sliding in the holder 1a in the axial direction and can therefore be fixed, for example, without the occurrence of undesired distortions in the material after reaching an intended position. In addition to this axial alignment, alignment about a rotation axis can be carried out as described for FIG. 2.

Figure 4:
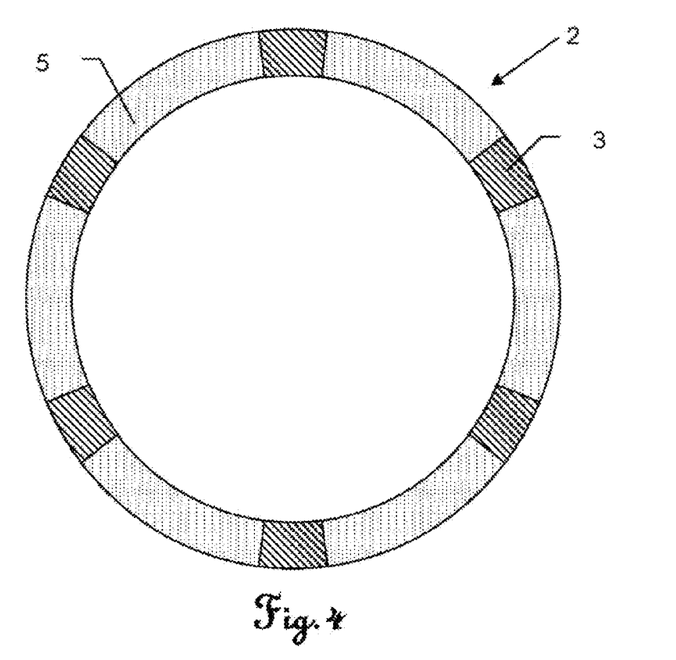
FIG. 4 shows an embodiment of the stabilization component according to the invention with a frame and six stabilization elements.

FIG. 4 shows a stabilization component 2 according to the invention in a section perpendicular to the mounting direction. The component comprises a frame 5, on which six stabilization elements 3 of the same type are arranged. The stabilization component 2 is configured circularly in this case, and is suitable for the installation of a round and rotationally symmetrical optical assembly into a corresponding holder. The stabilization elements 3 are aligned parallel to the mounting direction 6 (according to FIG. 2) of the stabilization component 2.

Figure 5:
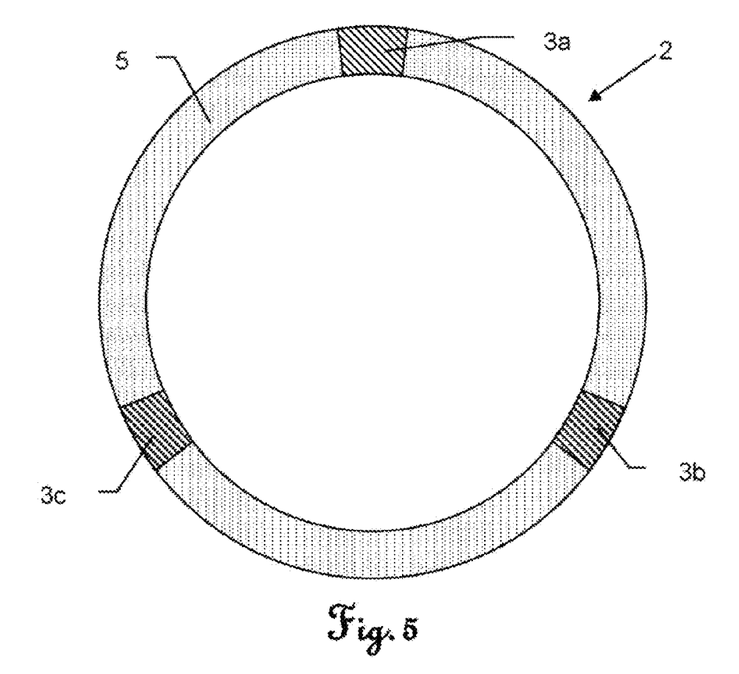
FIG. 5 shows another embodiment of the stabilization component according to the invention with a frame and three stabilization elements.

In contrast, FIG. 5 shows a second embodiment of a stabilization component 2 according to the invention, likewise in a section perpendicular to the mounting direction, which comprises three different stabilization elements 3a, 3b, 3c on a frame 5; in particular the stabilization elements 3a, 3b, 3c may differ in terms of design or material. This embodiment is suitable, in particular, for non-symmetrical designs of optical assemblies or holders. As in FIG. 3, the stabilization elements 3a, 3b, 3c are also aligned parallel to the mounting axis of the component here.

Figure 6:
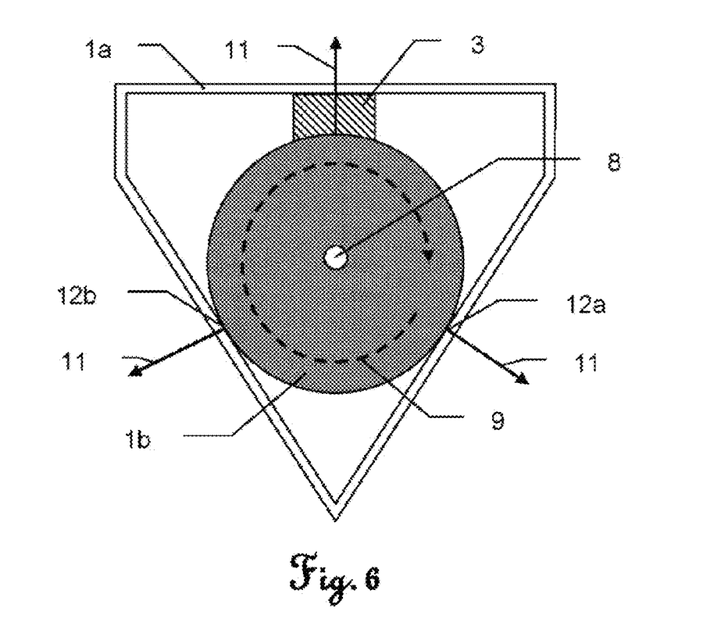
FIG. 6 shows an embodiment of an optical assembly and holder with a stabilization element according to the invention in cross section and in the mounted state.

FIG. 6 shows an embodiment of an optical assembly 1b and a holder 1a for the assembly in the mounted state. In this embodiment, a single stabilization element 3 according to the invention is used for the mounting, the optical assembly 1b being in contact with the holder 1a at two further contact points 12a, 12b, and therefore supported stably. After the approximate mounting, in the approximately mounted state precision alignment of the two components with respect to one another also takes place in this case. A rotation 9 about the optical axis 8 or an axial alignment are possible owing to a suitable number of stabilization elements 3—here only a single one—and the therefore adjustable radial forces 11. The radial forces appearing are in this case distributed substantially symmetrically, here for example rotationally symmetrically radially around the optical axis at an angle of 120° to each other, onto the contact points 12a, 12b and the stabilization element 3. If there are a larger number of stabilization elements 3, the radial forces 11 will be distributed substantially symmetrically over a plurality of individual elements.

In another embodiment, for example, six stabilization elements 3 may be provided which are arranged symmetrically around the axis 8, neighboring elements 3 respectively being arranged at an intermediate angle of 60° with respect to one another. In addition, the optical assembly 1b can be moved in the holder 1a along the optical axis 8, and can thereby be aligned in relation to a second direction.

Figure 7:
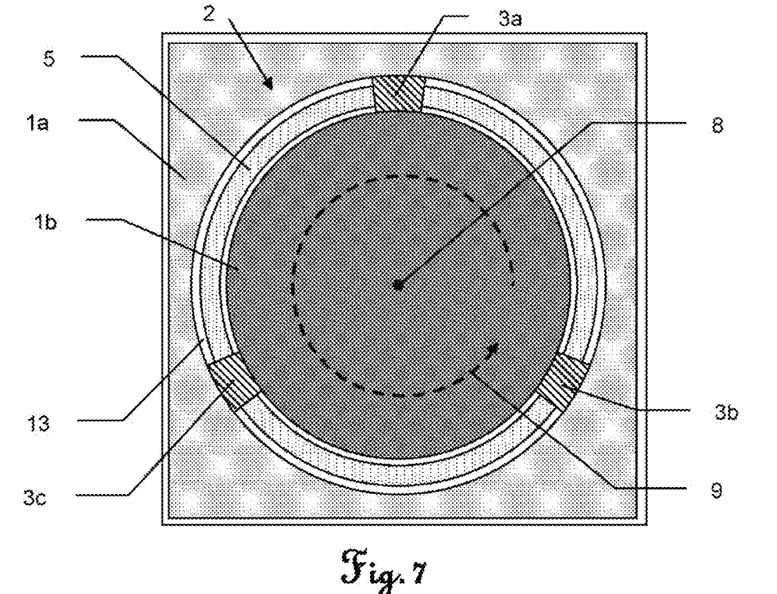
FIG. 7 shows another embodiment of an optical assembly and holder with a stabilization component according to the invention with three stabilization elements in cross section and in the mounted state.

Another embodiment according to the invention is shown in FIG. 7. An optical assembly 1b is mounted into a suitable holder 1a by means of a stabilization component 2. The stabilization component 2 is located in a gap 13 provided between the optical assembly 1b and the holder 1a. It comprises a frame 5 in ring form, on which three stabilization elements 3a, 3b, 3c, which protrude beyond the frame 5 on both sides, are arranged. The thickness of the stabilization elements 3a, 3b, 3c in the unmounted state is greater than the width of the gap 13. In the mounted state shown, the stabilization elements 3a, 3b, 3c are compressed in such a way that existing tolerances of the rest of the components are compensated for and in the mounted state there are required shock resistances and, under thermal influences, sufficient positional stability. As in the embodiment in FIG. 6, here again precise alignment of the optical assembly 1b with respect to the holder 1a is carried out by rotation 9 of the parts with respect to one another, about the optical axis 8 of the assembly 1b.

Figure 8:
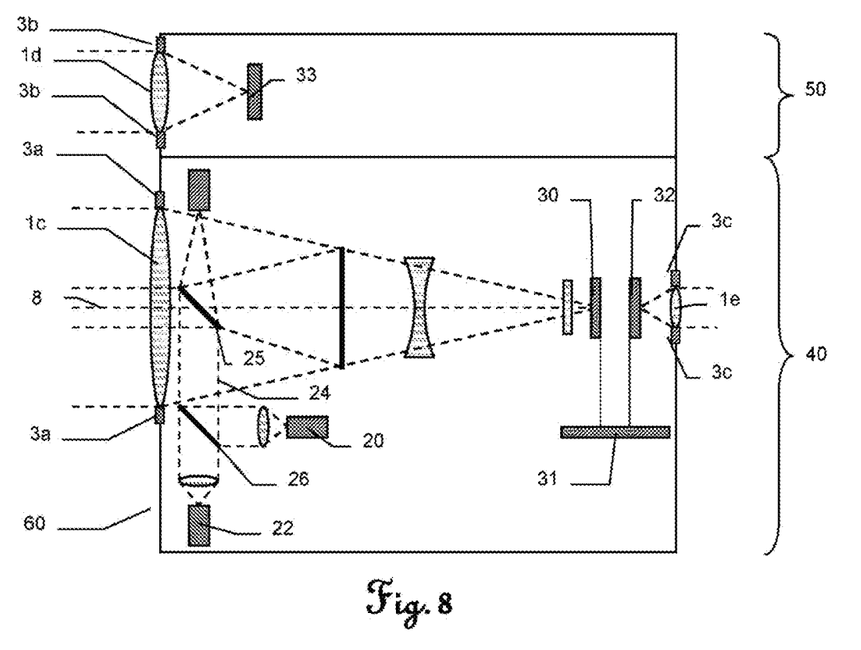
FIG. 8 shows an embodiment of sighting unit optics with stabilization elements according to the invention.

FIG. 8 shows a sighting unit 40 having an objective 1c, focusing optics 22, a camera sensor 30, a display part 32 and an eyepiece 1e. In addition, a viewing unit 50 having a viewing camera 33 and a second objective 1d is shown. The sighting unit 40 and the viewing unit 50 are arranged in a housing 60.

Between the objectives 1c, 1d and the housing 60, and between the eyepiece 1e and the housing 60, stabilization elements 3a, 3b, 3c according to the invention are respectively arranged which are suitable for ensuring shock-resistant and thermally stable support. For a distance measurement and an automatic target search function, an EDM laser source 20 and a fine targeting light source 22 are respectively provided, the EDM laser beams and the fine targeting beams being correspondingly coupled into and out of the beam path 24 by means of a first and a second beam combiner 25, 26—for example beam splitter surfaces with a dichroic coating. With the possibility of precise adjustment of the objective 1c, additionally provided by the stabilization elements 3a, accurate alignment of the beam path 24 and the optical axis 8 of the objective 1c can be carried out. In particular, the precise alignment of a combination component, consisting of at least one objective 1c and a beam combiner 25, may be indispensable in relation to the course of the beam path 24. The objective 1c may, for example, also be constructed in the form of a plurality of lenses, or may be configured panfocally.

The sighting unit 40 furthermore contains a graphics processor 31, which is connected to the camera sensor 30 and the display part 32 so that an acquired camera image can be observed by a user through the eyepiece 1e as a generated display image.

Figure 9:
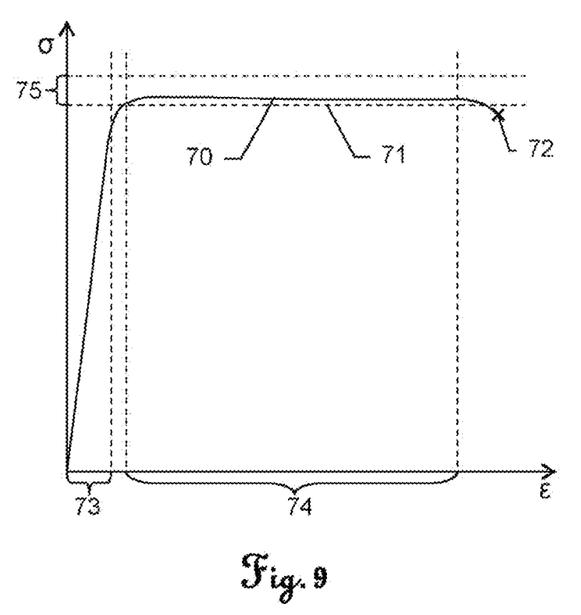
FIG. 9 shows a stress/strain curve for a material of which a stabilization element according to the invention is made.

FIG. 9 shows an (idealized) stress/strain curve 70 for a material of a stabilization element 3, 3a, 3b, 3c according to the invention, for example for an acetal copolymer. Such a curve represents a typical result of a tensile test. The percentage strain ϵ of the material is indicated as a function of a material stress σ, in particular a tensile stress. The elastic/plastic behavior of the material in the tensile test is to be regarded as very similar to the behavior under compressive loading—as can occur for the stabilization element 3, 3a, 3b, 3c according to the invention.

The material used for the stabilization element 3, 3a, 3b, 3c according to the invention has the property of a maximum material stress value above an elastic limit or yield point 71 remaining substantially constant over a particular strain range. The terms elastic limit and yield point are in this case used depending on the composition of the material in question. The elastic limit or yield point 71 is a material characteristic, and describes the stress σ beyond which a material exhibits plastic (irreversible) deformation, or up to which the material exhibits no plastic deformation. The occurrence of plastic deformation is to be understood as meaning that it can occur only to a relatively small extent (in comparison with the elastic deformation) with a strain ϵ up to the elastic limit 71 (technical elastic limit), but (significant) plastic deformation of the material in the sense of the invention takes place when the elastic limit 71 is exceeded. This minimal occurrence of plastic deformation with a strain of (elastic) materials is known to those skilled in the art. The material may exhibit an initially steeply rising stress σ with increasing strain ϵ (linear-elastic range 73 of the curve 70), while with a further strain ϵ after reaching the elastic limit 71 the material stress σ reaches a local maximum stress value and this stress value remains essentially constant regardless of any further strain increase. In this context, a plastic range 74, in which the deformation of the material takes place for the most part plastically, may be assigned to the material in the curve profile. This range 74 corresponds according to the invention to a working range of the stabilization element 3, 3a, 3b, 3c, i.e. the stabilization element 3, 3a, 3b, 3c is in the approximately positioned or compressed state and, even during the adjustment of the optical assembly relative to the holder, is in a deformation state such that the elastic limit is exceeded and there is a material load (compression) within the plastic range 74. As a function of the specific material properties of the stabilization element 3, 3a, 3b, 3c, there is in this case a strain range (which corresponds in terms of strain to the plastic range 74) within which a strain variation can take place without the value of the stress σ in the material experiencing any substantial change. The plastic range 74 in this case comprises in particular a material strain value of up to 70%, in particular from 5% to 65%—before fracture 72 of the material begins outside the plastic range 74. The linearly flat asymptotic profile represented for the curve 70 above the elastic limit 71 (and within the plastic range 74) is intended to be understood in the context of the invention as an essentially constant maximum material stress with varying material strain ϵ. A stress change occurring as a function of the strain change is very small or non-existent here in relation to a corresponding variation in the linear-elastic range 73. In particular, in a specific embodiment the material may in this context exhibit a stress change from the local maximum material stress value as a function of a creep behavior of the material in the event of a strain variation within the plastic range 74.

In particular, according to the invention the stabilization element 3, 3a, 3b, 3c in an approximately positioned state, i.e. in a state in which the stabilization element 3, 3a, 3b, 3c is compressed between the holder and the optical assembly, is in a loading state above the elastic limit 71 or yield point. In this state, a further strain ϵ or compression of the material can therefore take place, the material stress σ remaining substantially constant. The material is in this case—in the sense of the invention—plastically deformed. In particular during the mounting of the optical assembly into the holder provided therefor by using this stabilization element 3, 3a, 3b, 3c according to the invention the mounting can be carried out highly accurately, and without the occurrence of undesired material stresses, within a particular dimensional tolerance range for the components.

From a stress/strain curve 70, a stress/strain gradient can furthermore be derived for a manufacturing material of a stabilization element 3, 3a, 3b, 3c according to the invention. The stress/strain gradient is in this case a quantity dependent on the material state, and is defined by the slope (dσ/dϵ) of the stress/strain curve 70 in respective ranges 73, 74. According to the invention, the manufacturing material has in particular a low stress/strain gradient (close to 0) at any strain ϵ at which a stress σ above the elastic limit is induced, i.e. a stress/strain gradient which is represented by a slope of the stress/strain curve 70 between −1000 MPa (MPa/(m/m)) and +1000 MPa, in particular between −500 MPa and +500 MPa, in particular between −250 MPa and +250 MPa, in particular between −100 MPa and +100 MPa, of the stress/strain curve 70 within the plastic range 74. In this case, the manufacturing material is to be understood as a material having homogeneous plastic properties (within the plastic range 74) above the elastic limit 71.

In this context, the stabilization element 3, 3a, 3b, 3c is made of a material which, in the event of a deformation beyond the elastic limit, has a stress value of less than 1000 MPa, in particular a stress value of between 5 MPa and 1000 MPa, in particular between 5 MPa and 250 MPa, in particular between 2 MPa and 150 MPa.

Furthermore, the material for a stabilization element 3, 3a, 3b, 3c according to the invention is preferably to be selected in such a way that the stabilization element 3, 3a, 3b, 3c is plastically deformable with an essentially constant material strength within the plastic range 74. In the event of a strain or compression of the stabilization element 3, 3a, 3b, 3c, in particular above the elastic limit, no variation or only a relatively small variation of the material strength then takes place in the scope of the specific low stress/strain gradient.

What is claimed is:

1. A geodetic apparatus for surveying, comprising:
   an optical assembly having at least one optical element which defines an optical axis;
   a holder for the optical assembly, the holder having a shape which is suitable for at least approximately accommodating the optical assembly, in an inserted state the optical assembly is inserted within the holder with a gap with a defined width between the optical assembly and the holder; and
   a stabilization component for tolerance compensation and for stable connection of the optical assembly and the holder, having at least one stabilization element which can be compressed in the gap in the inserted state, wherein:

the stabilization element in an unmounted state has a thickness which is greater than the width of the gap, the optical assembly, the holder and the stabilization component are formed in such a way and interact in such a way that in an approximately positioned state of the stabilization component, by inserting the optical assembly into the holder, the stabilization element positioned between the optical assembly and the optical holder is compressed in the gap and is plastically deformed in the gap in such a way that residual elastic forces act radially with respect to the optical sighting axis between the assembly and the holder, and the assembly and the holder are stabilized with respect to one another in the radial direction, the stabilization element comprises a deformation zone, and the stabilization element comprises a material having homogeneous plastic properties; and the stabilization component comprises a standalone component that is separate from the optical assembly and the holder.

2. The geodetic apparatus as claimed in claim 1, wherein the number of stabilization elements and the residual elastic forces therefore acting perpendicularly to the optical axis are selected in such a way that, in an adjustment state, the angular setting of the optical assembly with respect to the holder can be aligned with high precision.

3. The geodetic apparatus as claimed in claim 1, wherein the number of stabilization elements and the residual elastic forces therefore acting perpendicularly to the optical axis are selected in such a way that, in an adjustment state, the angular setting of the optical assembly with respect to the holder can be aligned with high precision by a sliding rotation movement, and/or the optical assembly can be axially adjusted with respect to the holder, the stabilization elements being plastically deformed.

4. The geodetic apparatus as claimed in claim 1, wherein by fixing in a finally mounted state, the optical assembly and the holder are retained in the high-precision alignment.

5. The geodetic apparatus as claimed in claim 1, wherein at least three stabilization elements are arranged on a stabilization component.

6. The geodetic apparatus as claimed in claim 1, wherein the stabilization component has a frame.

7. The geodetic apparatus as claimed in claim 1, wherein the stabilization component is annular and the stabilization elements are arranged uniformly distributed over the stabilization component and aligned in the axial direction.

8. The geodetic apparatus as claimed in claim 1, wherein the stabilization element consists of a material with a homogeneous plastic flow range.

9. The geodetic apparatus as claimed in claim 1, wherein the optical instrument is configured a total station, and the optical assembly is configured as a telescope objective.

10. The geodetic apparatus as claimed in claim 1, wherein the stabilization element has an essentially constant maximum material stress within a material stress range above an elastic limit with varying material strain and in the approximately positioned state is in a loading state above the elastic limit.

11. The geodetic apparatus as claimed in claim 1, wherein the stabilization element consists of a particular manufacturing material having a defined stress/strain gradient within a plastic range of a stress/strain curve representing a stress/strain property of the manufacturing material, in particular with the stress/strain gradient being defined by a slope of between −1000 MPa/(m/m) and +1000 MPa/(m/m).

12. The geodetic apparatus as claimed in claim 1, wherein the stabilization element consists of a particular manufacturing material having a defined stress/strain gradient within a plastic range of a stress/strain curve representing a stress/strain property of the manufacturing material with the stress/strain gradient being defined by a slope of between −250 MPa and +250 MPa, of the stress/strain curve for the manufacturing material.

13. The geodetic apparatus as claimed in claim 1, wherein the stabilization element consists of a particular manufacturing material having a defined stress/strain gradient within a plastic range of a stress/strain curve representing a stress/strain property of the manufacturing material with the stress/strain gradient being defined by a slope of between −250 MPa and +250 MPa, of the stress/strain curve for the manufacturing material with the manufacturing material having a material stress value of between 5 MPa and 1000 MPa within the plastic range with the stabilization element being plastically deformable with an essentially constant material strength within the plastic range.

14. The geodetic apparatus as claimed in claim 1, wherein the at least one optical element includes a lens.

15. A stabilization component for the precisely positioned mounting of an optical assembly having a defined optical axis in a holder in a geodetic apparatus as claimed in claim 1, having at least one stabilization element which can be compressed in the gap, wherein:

the stabilization element in an unmounted state has a thickness which is greater than the width of the gap; and the optical assembly, the holder, and the stabilization component are formed in such a way and interact in such a way that in an approximately positioned state, by inserting the optical assembly into the holder, the stabilization element positioned between the optical assembly and the holder is compressed in the gap and is plastically deformed in the gap in such a way that residual elastic forces act radially with respect to the optical axis between the assembly and the holder and the assembly and the holder are stabilized with respect to one another in the radial direction, and the stabilization element has a deformation zone, and the stabilization element comprises a material having homogeneous plastic properties.

16. A mounting method for the precisely positioned mounting of an optical assembly of a geodetic apparatus, the optical assembly having a defined optical axis in a holder, there being a gap with a defined width between the assembly and the holder in the assembled state, with a stabilization component, the stabilization component comprising a standalone component that is separate from the optical assembly and the holder, with at least one stabilization element, the stabilization element having a deformation zone, and the stabilization element comprising a material having homogeneous plastic properties, which can be compressed in the gap, and the method comprising:

approximate positioning of the optical assembly and the holder with respect to one another and placement of a stabilization component between the assembly and the holder;

compression of the stabilization element between the assembly and the holder, so that the stabilization element is deformed within a homogeneous plastic range and residual elastic forces act radially with respect to the optical axis between the assembly and the holder, in such a way that the two components are stabilized with respect to one another in the radial direction;

adjustment of an angular setting and/or an axial position of the optical assembly with respect to the holder, the plastic deformation of the stabilization element being preserved; and fixing of the optical assembly and the holder so that they are retained in the adjusted angular setting and/or the axial position.

17. The mounting method as claimed in claim 16, wherein the adjustment of the optical assembly with respect to the holder is carried out by rotation of the optical assembly about the optical axis and/or by an axial movement parallel to the optical axis.

18. The mounting method as claimed in claim 16, wherein:
the stabilization element has an essentially constant maximum material stress within a material stress range above an elastic limit with varying material strain and in the approximately positioned state is in a loading state above the elastic limit, and/or the stabilization element consists of a particular manufacturing material having a defined stress/strain gradient within a plastic range of a stress/strain curve representing a stress/strain property of the manufacturing material with the stress/strain gradient being defined by a slope of between −1000 MPa/(m/m) and +1000 MPa/(m/m).

19. The mounting method as claimed in claim 16, wherein the stabilization element consists of a particular manufacturing material having a defined stress/strain gradient within a plastic range of a stress/strain curve representing a stress/strain property of the manufacturing material with the stress/strain gradient being defined by a slope of between −250 MPa and +250 MPa, of the stress/strain curve for the manufacturing material with the manufacturing material having a material stress value of between 5 MPa and 1000 MPa within the plastic range with the stabilization element being plastically deformed with an essentially constant material strength within the plastic range.

20. The geodetic apparatus as claimed in claim 6, wherein the frame in particular has a shape corresponding to the shape of the holder and/or of the optical assembly.

\* \* \* \* \*